Figure 1:
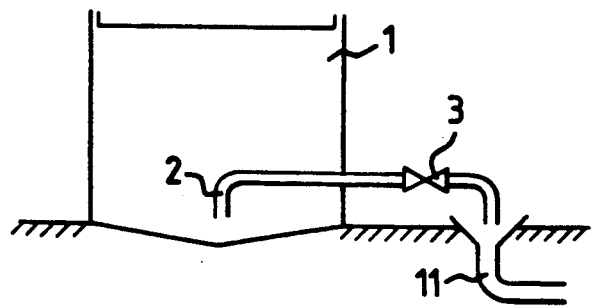

United States Patent [19]

Ludlam et al.

[11] Patent Number: 5,139,653
[45] Date of Patent: Aug. 18, 1992

[54] SYSTEM FOR DRAINING WATER FROM OIL STORAGE TANKS WITH PERIODIC MONITORING AND RECIRCULATION

[75] Inventors: Richard Ludlam, Bath; William B. Palmer, Devizes, both of United Kingdom

[73] Assignee: Ludlam Sysco Ltd., United Kingdom

[21] Appl. No.: 599,642

[22] Filed: Oct. 18, 1990

[30] Foreign Application Priority Data

Oct. 19, 1989 [GB] United Kingdom ............... 8923598

[51] Int. Cl.$^5$ ..................... B01D 17/12; C10G 33/08
[52] U.S. Cl. .................................. 210/85; 73/61.43; 137/2; 137/565; 208/187; 210/96.1; 210/138; 417/12
[58] Field of Search .......... 73/61.1 R, 863.83, 863.86; 137/2, 172, 565; 210/96.1, 138, 167, 248, 85, 194; 417/1, 12, 14; 134/186; 208/187

[56] References Cited

U.S. PATENT DOCUMENTS

| | | | |
|---|---|---|---|
| 2,736,201 | 2/1956 | Ohlsen et al. | 73/863.86 |
| 2,773,556 | 12/1956 | Meyers et al. | 210/96.1 |
| 2,896,657 | 7/1959 | Uhll et al. | 137/172 |
| 4,065,389 | 12/1977 | McGrew | 210/96.1 |
| 4,153,553 | 5/1979 | Davis | 210/95 |
| 4,647,371 | 3/1987 | Schmitt et al. | 210/96.1 |
| 4,804,464 | 2/1989 | Schevey | 210/96.1 |
| 4,836,017 | 6/1989 | Bozek | 73/61.1 R |
| 5,070,725 | 12/1991 | Cox et al. | 73/61.1 R |

Primary Examiner—Robert A. Dawson
Assistant Examiner—Joseph Drodge
Attorney, Agent, or Firm—Davis, Bujold & Streck

[57] ABSTRACT

An automatic drainage system is described for draining one of two non-miscible liquids which are of different densities from at least one tank (1) via a drain valve (3,10,60) including a system for monitoring the relative proportions of the non-miscible liquids in the liquid flow along the drain line (2). According to the invention the monitoring system includes a recirculating path (2A, 26 FIGS. 1 to 5: 2A FIG. 6) for liquid from the drain line (2) back to the tank (1), a pump (5) in the recirculating path for moving liquid around the path, the pump being arranged to maintain a substantially constant liquid flow around the path substantially independently of the head of liquid in the tank, a detector (7) in the path having at least one sensing head (8) for sensing the relative proportions of the two non-misible liquids flowing in said path, and control means (9) for controlling the system in dependence upon said relative proportions. In operation, the control means (9) initiates operation of the pump (5) to circulate the liquid in the path for a preset period to purge the recirculating path, after which the pump is switched off unless the detector head(s) 8 sense an unacceptable proportion of said one liquid whereupon the control means operates to open the drain valve (10, FIGS. 1 to 5; 60 FIG. 6) and drain said one liquid until said proportion reaches an acceptable level.

9 Claims, 2 Drawing Sheets

SYSTEM FOR DRAINING WATER FROM OIL STORAGE TANKS WITH PERIODIC MONITORING AND RECIRCULATION

This invention relates more particularly, but not exclusively to the draining, by automatic means, of water which collects at the bottom of oil storage tanks. It could also be applied to other situations where it is necessary to separate two non-miscible liquids having different densities.

The usual method of draining water from the bottom of oil storage tanks is by manual operation of a drain valve at the exit of the drain line as shown in FIG. 1 of the accompanying drawings in which the reference numeral 1 designates the tank, 2 the drain line, 3 the drain valve and 11 the piping to the oil/water separation facilities. The drain line, installed by the tank manufacturer, is usually 6" in diameter and extends to the centre of tanks which have conical "apex down" bottoms, the large diameter being necessary because the operator has to be in attendance during the draining operation in order to check the effluent and, therefore, needs to be in attendance for the minimum possible time. A problem, resulting from draining the tank at a fast rate is that the interface plane between the oil and the water becomes depressed over the exit port and, in consequence, oil is sucked into the drain before all the water has been cleared from the tank. Thus the manual operation is frequently stopped prematurely.

Simple, automatic drainage systems already exist employing a detector which senses the presence of oil in the drain line and closes the drain valve, automatically, when the proportion of oil in the oil/water mixture reaches a preset maximum value. There are two problems with these existing automatic drainage systems.

Firstly, when the preset value is reached the drain valve closes automatically therefore trapping oily water in the drain line which remains trapped when further water entering the tank rises above the drain line inlet. Before water can be drained again from the tank the drain line containing the oily water mixture must be purged dumping the mixture to the oil/water separation facility so that the separated oil can be reprocessed. The volume of oil dumped per operation of the drain valve can be within the range 500 to 2000 liters depending upon the size of the tank and the diameter of the drain line.

Secondly, the oil/water mixture flows over the sensing head at a relatively low and variable velocity—the said velocity being determined, substantially by the head of liquid contained within the storage tank. Since the velocity is low, there is a tendency for deposits to form on the sensing head which can reduce the accuracy of the system causing a maloperation to occur.

The object of the invention is to provide an automatic drainage system in which the aforesaid problems are overcome.

According to the invention, there is provided an automatic drainage system for draining one of two non-miscible liquids which are of different densities from at least one tank via a drain valve including a monitoring system for monitoring the relative proportions of the non-miscible liquids in the liquid flow along the drain line, wherein the improvement comprises the monitoring system including a recirculating path for liquid from the drain line back to the tank, a pump in the recirculating path for moving liquid around the path, the pump being arranged to maintain a substantially constant liquid flow around the path substantially independently of the head of liquid in the tank, a detector in the path for sensing the relative proportions of the two non-miscible liquids flowing in said path, and control means for controlling the system in dependence upon said relative proportions, the arrangement being such that the control means initiates operation of the pump to circulate the liquid in the path for a preset period to purge the recirculating path after which the pump is switched off unless the detector senses an unacceptable proportion of said one liquid whereupon the control means operates to open the drain valve and drain said one liquid until said proportion reaches an acceptable level.

Advantageously, said control means includes timing means for controlling the preset period during which the pump is in operation, said timing means also being operable to enable the pump to be switched off for a preset resting period and to enable the cycle of pump operation to be repeated at intervals.

The recirculating path may include the drain line such that the pump can also be used to discharge the drain liquid through the drain valve. Alternatively the recirculating path can branch from the drain line at a position upstream of the pump. This enables the drain line to be of large diameter relatively to that of the recirculating path and the flow along the drain line can be by gravity feed.

According to a feature of the invention for the drainage of water from the bottom of an oil tank, the detector comprises two sensors arranged to provide respective signals related to relative proportions of oil and water in the liquid, and a logic circuit is provided to which said signals are fed for processing to provide an output for the control means, the arrangement being such that two "water present" signals from the detector are required for opening the drain valve, whilst a single "oil present" signal from either sensor is required for closing said drain valve. Furthermore, any deviation in the readings of the two sensors after a settable time interval (indicating that one detector is at fault) can be arranged to activate a warning signal.

For a system including a plurality of tanks, conveniently a drain line and return line from each tank are each connected into a respective manifold drain line and manifold return line, the recirculating path is connected between the two manifold lines, and valves are provided in each drain and return line for each tank, whereby each tank can be isolated from the other tank for sampling.

Figure 2:
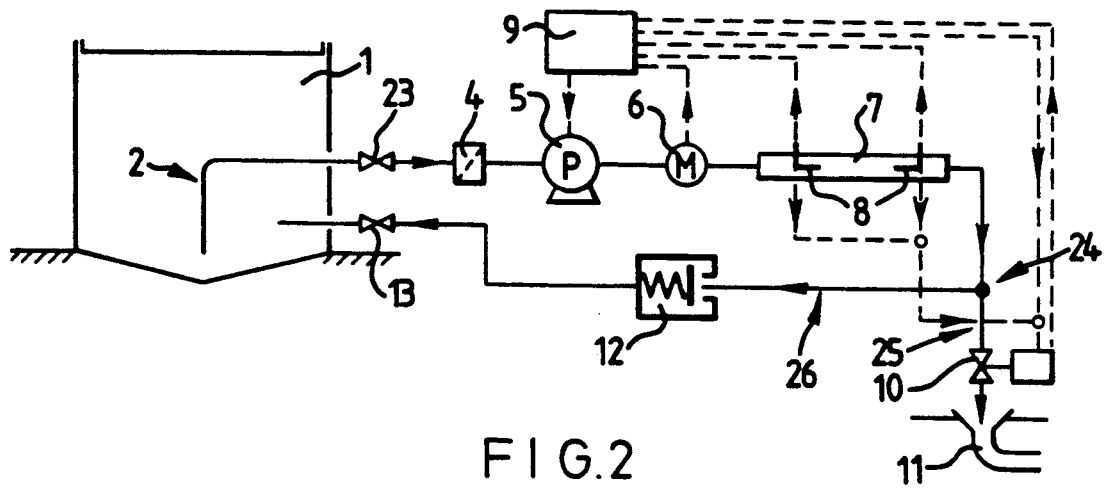
Figure 3:
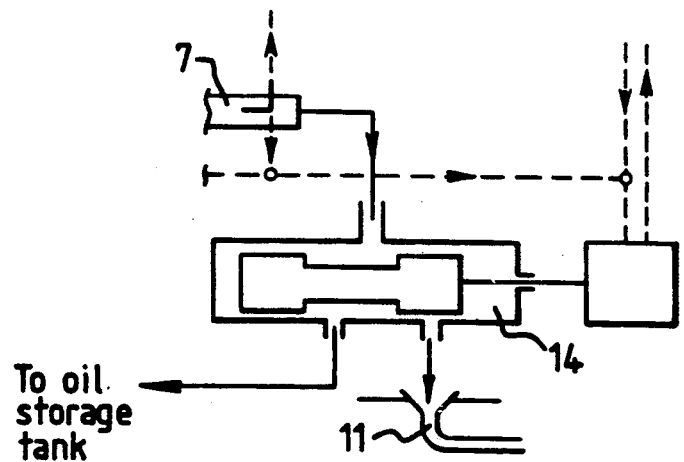
Figure 4:
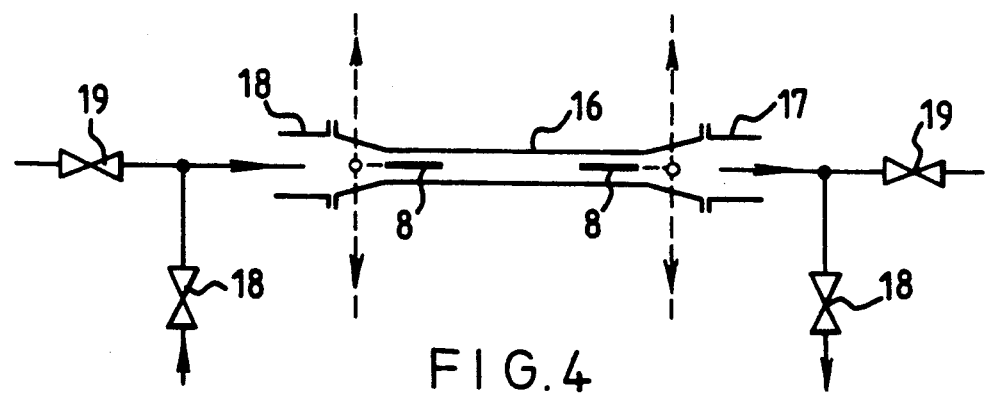
Figure 5:
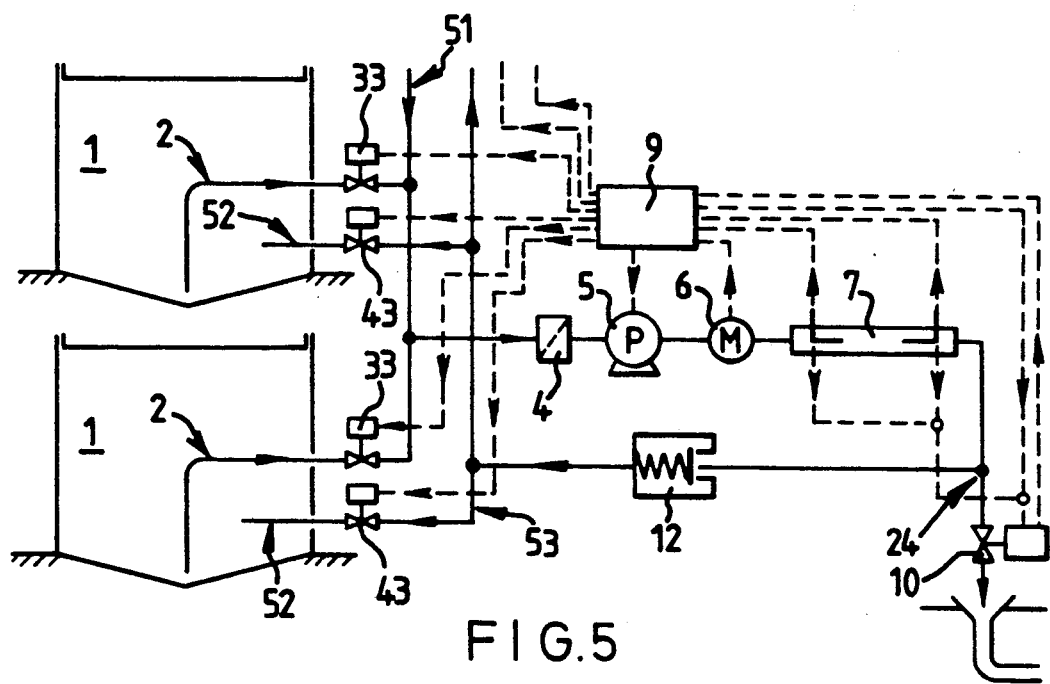
Figure 6:
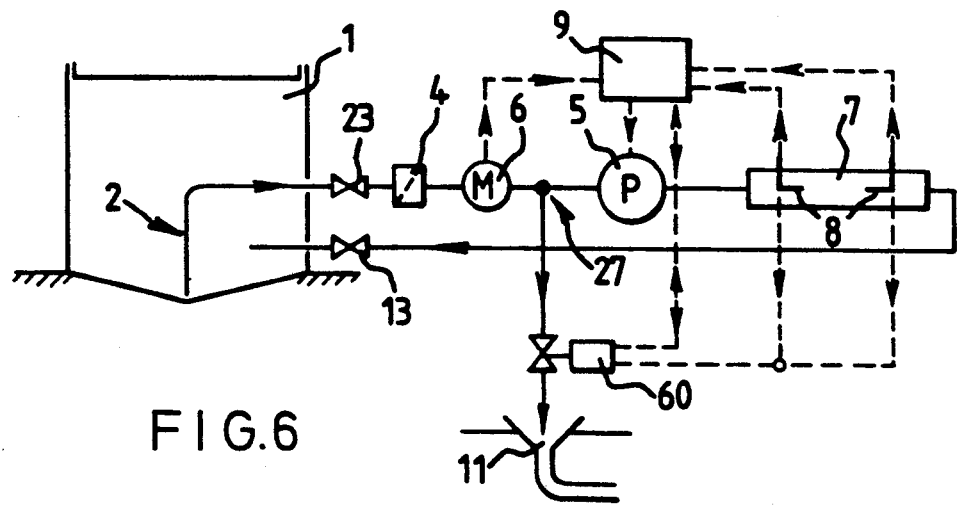

The invention will now be described with reference to the accompanying drawings in which:

FIG. 1 shows the existing method of tank draining as previously described,

FIG. 2 shows a simplified flow diagram of a first drainage system in accordance with the invention, FIG. 3 shows an alternative design for part of the system of FIG. 2, FIG. 4 is a more detailed illustration of that part of the system containing the oil sensing heads, FIG. 5 shows a flow diagram corresponding to that of FIG. 1 as applied to a number of tanks in a tank farm, and FIG. 6 shows a flow diagram of another drainage system in accordance with the invention.

Referring to FIG. 2, the oil storage tank 1 is provided with a drain line 2 the inlet end of which is positioned at or near the lowest region of the tank 1. The oil storage tank drain line 2 leads to a manually operated isolating valve 23 which is left normally in the open position and then via an extension of the drain line 2A to a filter 4 which protects a pump 5. The pump 5 is preferably a positive displacement type in order to provide substantially constant flow irrespective of system pressures.

From the pump delivery port the flow passes to a flowmeter 6 after which the flow enters a special sensing section, or detector 7 in which are contained two sensor heads 8. Signals from the sensor heads proportional to the oil/water concentration are amplified and compared with the preset oil/water concentration in the logic 9.

After the special tube section the piping divides at junction 24 with one path going to a solenoid operated two-port drain valve 10. A short section of pipe 25 from the solenoid operated valve 10 terminates at a flange to which the piping to the oil/water separation facilities 11 is connected. The other path 26 returns the flow to the oil storage tank 1 via back-pressure maintaining valve 12 and through the tank isolating valve 13 the latter being left normally in the open position. The purpose of the back-pressure maintaining valve 12 is to maintain a sufficient pressure on the upstream side such that all the flow passes through the solenoid valve 10 when it is open but when the solenoid valve 10 closes sufficient pressure is generated by the pump 5 to overcome the spring force acting on the seat of the back pressure maintaining valve 12 so that the latter opens and allows liquid to be circulated back to the oil storage tank 1.

Thus the line 2, 2A from the tank 1 to the valve 10 constitutes a drain line. It also forms with the return line 26 a recirculating path providing a monitoring system for monitoring the relative proportions of oil and water in flow from the tank 1 as will be described.

FIG. 3 shows an alternative part of the circuit in which the two-port solenoid operated valve 10 and the back pressure maintaining valve 12 are replaced by a single three-port solenoid operated valve 14—so arranged that, in the solenoid energised state the liquid is discharged into the facility 11 and, in the de-energised state of the solenoid, liquid is returned to the oil storage tank 1.

FIG. 4 is a more detailed illustration of that part of the circuit between the pump 5 and the solenoid operated valve 10. The liquid from pump 5 passes into the pipe 15 and thence into the detector 7 comprising reduced bore tube 16 containing the two oil detecting sensing heads 8. The liquid, on leaving the reduced bore tube 16 passes into the pipe 17. The internal diameters of the pipes 15 and 17 and the tube 16 are so arranged that the effective cross sectional area of the tube 16 in the region of the sensing heads 8 is about half the cross sectional area of the pipes 15 or 17, so that the velocity of the liquid passing over the sensing heads is approximately twice that existing in the rest of the recirculating path. Additional manual isolating valves 18 and 19 are shown in FIG. 4. These are optional valves which enable the oil sensing heads 8 to be calibrated without the need to remove them from the assembly. As an alternative to having a reduced bore for the detector section 7 the sensing heads 8 can be of such a size to restrict the cross-section of the tube and produce the same effect.

A typical operation of the automatic water drain system will now be described and it will be assumed that the sensing heads 8 need to be calibrated "on site" so that the optional isolating valves 18 and 19 are fitted. The oil in water sensing heads are typically instruments which measure the dielectric constant of the fluid passing over the head. The head and the enveloping tube form the two "plates" of a capacitor. An associated electronic circuit converts the capacitance into an electric current—such that the electric current is substantially proportional to the percentage of water contained in the oil/water mixture.

During the calibration operation, valves 19 are closed and valves 18 are used to flow, first oil and then water, from separate calibration tanks, (not illustrated) through the sensing pipe 16. The associated electronic circuit is then set up so that, with 100% oil flowing in the tube, 4 milliamps is passing through the sensing circuit and, with 100% water flowing, the corresponding current flow is 20 milliamps.

The recirculating path is then arranged to activate the control and/or the alarm circuits when the oil in water percentage reaches values, typically, between 5% and 10%. For example, assuming a linear relationship between current and the proportion of water present, a 10% oil/water mixture will register:

$$20 - \frac{10}{100} (20 - 4) = 18.4 \text{ milliamps}$$

At the end of a preset "resting" state, during which the solenoid valve 10 is shut a timer in the logic 9 starts up the pump 5 recirculating liquid from the oil storage tank 1 through the filter 5, sensing tube 16, flowmeter 6 and returning to the storage tank via the back pressure maintaining valve 12. Assuming that no water is present, the recirculation will last for a preset period of typically, 10 minutes to purge the drain line 1 after which the logic 9 will switch off the pump 5 and then repeat the 10 minute recirculation cycle at intervals of typically 5 or 6 hours. This resting state duration is adjustable.

If during the recirculation state both sensing heads indicate that the liquid passing through the detector 7 contains less than the preset concentration of oil the logic 9 will open the solenoid valve 10 and allow the water to flow to the separation facilities 11.

The draining operation will continue until one of the two sensing heads 8 detects that an oil concentration, greater than the permitted concentration is present. This signal will shut the solenoid operated valve 10. The pump will continue to run for a further period of a few minutes recirculating the liquid to the tank during which time the reading from the second sensing head 8 will be compared to the reading from the other sensing head which terminated the drainage operation. If both sensing heads 8 register the same concentration of oil within a permitted tolerance, the system will revert automatically to the "resting" state. Should the two sensing heads not register the same oil concentration, indicating that there is a fault in a sensing head or in the associated circuits, the logic 9 will initiate a fault alarm and optionally shut down the system.

In order to prevent the accidental discharge of oil to the separation facilities 11 and to comply with the requirements of certain petro-chemical installations, the following additional monitoring and safety features are incorporated into the system:

(a) The sensing heads 8 can cause the solenoid valve 11 to close independent of the logic 9. This is to satisfy the requirement that safety shut down circuits must not be operated via microprocessors in certain situations.

(b) The flowmeter 6 pulsed output signal is connected to the logic. A totalising counter within the logic registers the volume of water discharged during each draining cycle, i.e. when drain valve 10 is open. Should this counter record a total drained volume in excess of a preset maximum, the solenoid operated valve 10 is automatically closed.

(c) A travel monitor switch is provided in the solenoid operated valve 10. The switch will initiate an alarm signal if the solenoid operated valve 10 fails to reach the closed position when the coil is de-energised. Alternatively, an alarm signal will be initiated if a flow is registered by the flowmeter 6 when the system is in the resting state. This also indicates a failure of the solenoid operated valve 10 to close. A further alarm also operates when a low flow rate is detected when the system is in the recirculation mode. This indicates a failure of the pump 5.

In a tank farm where several oil storage tanks are placed adjacent to each other, it is possible for a single automatic water drainage system to be installed and to sample and recirculate the liquid in each tank in turn. In this case the isolating valves 23 and 13 will be replaced by motor operated valves 33 and 43, one set on each tank to be drained and the logic circuit will be extended to control these additional motor operated valves.

Such a system is shown in FIG. 5. Thus each tank 1 has its drain line 2 connected to a manifold line 51 via the valve 33 and the return line section 52 extends from manifold line 53 to the tank 1 via valve 43.

To effect an automatic drainage operation of a tank 1, the associated valves 33 and 43 are opened to connect the lines 2 and 52 into the common drain line and monitoring system described with reference to FIGS. 2 and 4.

As an alternative to the system shown in FIG. 1 in which the drain line also forms part of the monitoring system, the system can take the form shown in FIG. 6 in which the recirculating path of the monitoring system branches from the drain line at junction 27 upstream of the pump 5 and downstream of the flowmeter 6 and filter 4. The pump 5 only circulates flow over the sensors 8 which via the logic 9 signal valve 60 to open and close as previously described with reference to FIG. 2.

The system of FIG. 6 is particularly suited to large tanks having a large bore drain line 2, 2A along which the liquid flows by gravity feed. The valve 60 can be a large bore drain valve such as a motor operated valve (MOV) or solenoid valve or other electrical or pneumatic actuator.

Thus the automatic drainage system as described above has the following advantageous features:

1. The drain line 2A incorporates a return path to the tank 1 and the circulating pump 5 is so arranged that a high velocity of fluid can be maintained over the sensing head or heads 8 of the detector 7 the said velocity being substantially constant irrespective of the height of the fluid in the tank.
2. The pump 5 is arranged to operate for a limited period at regular intervals. The logic circuit is arranged to open the drain valve 60 when the concentration of one liquid falls below a preset level and closes the drain valve when the concentration rises above the preset level, the composition of the liquid at the sensing head or heads 8 of the detector 7 being substantially the same as the composition of the liquid at the bottom of the tank.
3. The logic causes the limited period of pump operation to be overridden and the pump to run continuously while the drain valve is open.
4. Two sensing heads 8 are fitted in the detector and the recirculating path is so arranged that the drain valve 10, 60 is only opened when the two sensing heads 8 each indicate a proportion of liquids equal, or substantially equal to the required value at which it is required to open the said drain valve.
5. The or each sensing head 8 of the detector 7 is located in a pipe having a reduced cross-sectional area for the liquid path than that existing in the rest of the circulation path.
6. Only one signal from a detector 7 is required to close the drain valve.
7. The pump 5 continues to circulate fluid through the detector 7 after one sensing head 8 has signalled the drain valve to shut and an alarm signal is initiated if the second detector head fails to give a reading of liquid concentration which is the same, within the required accuracy tolerance, as the concentration being registered by the sensing head which initiated the closed signal to the drain valve.

We claim:

1. An automatic drainage system for draining water containing liquid from the bottom of at least one oil storage tank comprising a drain line connected to a bottom portion of the tank, a drain valve in said drain line, and a monitoring system associated with said drain line for detecting oil content in liquid flowing through said drain line, wherein the monitoring system includes a recirculating path for liquid extending from said drain line back to said tank, a pump in the recirculating path for moving the liquid around said path, the pump being of a type effective for maintaining a substantially constant flow around said path substantially independently of a head of liquid in said tank, detector means in the recirculating path for sensing concentration of oil in liquid flowing in said path, and control means associated with said pump and said detector means for initiating pump operation to circulate liquid in said recirculating path for a preset purging period and for switching off the pump at the end of said preset purging period unless said detector means senses a concentration less than a preset acceptable level of oil in the circulating liquid in which case said control means are operative to open said drain valve to drain liquid through said drain line and to shut said drain valve when concentration of oil is at least at said acceptable preset level.

2. A drainage system according to claim 1, wherein said control means includes timing means for controlling the length of said preset purging period and for repeating said preset purging period at preset intervals.

3. A drainage system according to claim 1, wherein a restriction is included in said recirculating path in which said detector means are located for locally increasing the velocity of liquid flowing past said detector means.

4. A drainage system according to claim 1 wherein said pump is a positive displacement pump.

5. A drainage system according to claim 1, wherein said recirculating path is included within said drain line, said drain valve is branched from said drain line downstream of said detector means whereby said pump can be used also to discharge liquid through said drain valve, and a back pressure maintaining valve is included in said drain line downstream of said drain valve branch, the level of back pressure set by said valve being such that liquid can recirculate to the tank only when said drain valve is closed.

6. A drainage system according to claim 1, wherein said recirculating path is included within said drain line, a three-port control valve is included via two of its ports in said drain line between said detector means and said tank, said valve being connected via its third port for acting as said discharge valve, and a solenoid is provided for operating said valve to direct liquid back to said tank, or through said third port in dependence upon concentration of oil.

7. A drainage system according to claim 1, wherein the said recirculating path is branched from said drain line at a position upstream of said pump.

8. A drainage system according to claim 1, wherein said detector means comprises two sensors arranged to provide respective signals related to the acceptable preset level of oil in liquid flowing through said recirculating path, and a logic circuit is provided to which said signals are fed for processing to provide an output for said control means, two "water present" signals from said detector means being required for opening said drain valve but only a single "oil present" signal from either sensor being required for closing said drain valve via said logic circuit and control means.

9. An automatic drainage system for draining water containing liquid from the bottom of an oil storage tank comprising a drain line connected to a bottom portion of the tank, a drain valve in said drain line, and a monitoring system associated with said drain line for detecting oil content in liquid flowing through said drain line, a plurality of oil storage tanks, a drain line and return respectively being provided for each tank, each drain line and return being connected into a respective manifold drain line and manifold return line, the monitoring system including a recirculating path or liquid extending from said manifold drain line back to said manifold return line and valves provided in each drain line and return for each tank, whereby each tank can be isolated from said plurality of tanks for individual monitoring, a pump in the recirculating path for moving the liquid around said path, the pump being of a type which effective to main a substantially constant flow around said path substantially independently of a head of liquid in an individual tank being monitored detector means in the recirculating path for sensing concentration of oil in liquid flowing in said path, and control means associated with said pump and said detector means for initiating pump operation to circulate liquid in said recirculating path for a preset purging period and for switching off the pump at the end of said preset purging period unless said detector means senses a concentration less than a preset, acceptable level of oil in the circulating liquid in which case said control means are operative to open said drain valve of the tank being monitored to drain liquid through said drain line and to shut said drain valve of the tank being monitored when the concentration of oil is at least at said acceptable preset level.

* * * * *